United States Patent
Jaisinghani et al.

(10) Patent No.: US 8,825,817 B1
(45) Date of Patent: Sep. 2, 2014

(54) USING A TEMPLATE TO UPDATE A STACK OF RESOURCES

(75) Inventors: Avinash Jaisinghani, Seattle, WA (US); Reto Kramer, Sammamish, WA (US); Christopher Whitaker, Sammamish, WA (US); Nishanth Shankaran, Kirkland, WA (US); Jaykumar H. Gosar, Seattle, WA (US); Jeffrey L. Baker, Issaquah, WA (US); Daniel Osiecki, Seattle, WA (US); Danny Rabbani, North Bend, WA (US); Prashant Jayaraman, Bothell, WA (US); Venkates P. Balakrishnan, Seattle, WA (US); Adam M. Thomas, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 186 days.

(21) Appl. No.: 13/424,089

(22) Filed: Mar. 19, 2012

(51) Int. Cl.
*G06F 15/177* (2006.01)

(52) U.S. Cl.
USPC .......................................... 709/221

(58) Field of Classification Search
USPC ................................. 709/220–223
See application file for complete search history.

(56) References Cited

U.S. PATENT DOCUMENTS

| | | | |
|---|---|---|---|
| 6,766,364 B2 * | 7/2004 | Moyer et al. | 709/221 |
| 7,246,200 B1 * | 7/2007 | van Rietschote et al. | 711/114 |
| 7,290,164 B1 * | 10/2007 | Harvey et al. | 714/2 |
| 7,457,853 B1 * | 11/2008 | Chari et al. | 709/220 |
| 8,326,658 B1 * | 12/2012 | Lee et al. | 705/7.11 |
| 2010/0037287 A1 * | 2/2010 | Netrakanti et al. | 726/1 |
| 2010/0131624 A1 * | 5/2010 | Ferris | 709/221 |
| 2010/0318658 A1 * | 12/2010 | Zorn et al. | 709/226 |
| 2011/0320605 A1 * | 12/2011 | Kramer et al. | 709/226 |
| 2012/0147894 A1 * | 6/2012 | Mulligan et al. | 370/395.53 |

OTHER PUBLICATIONS

AWS Cloudformation user guide, api version May 15, 2010, pp. 1-468 (2013).*

* cited by examiner

*Primary Examiner* — Lance L Barry

(74) *Attorney, Agent, or Firm* — Robert C. Kowert; Meyertons, Hood, Kivlin, Kowert & Goetzel, P.C.

(57) ABSTRACT

Techniques are described that enable a user to upgrade a stack of resources by providing a template that reflects the desired end state of the stack. Upon receiving a new template, the system automatically detects changes that should be performed and determines the order in which the changes should be performed. The system can also detect if the desired changes to the stack are a result of direct modifications; because parameters to the resources have changed; or the changes are indirectly caused by other dependency/attribute changing. Additionally, the system determines whether the changes require creating new resources or if the changes can be made to the resources live. In case of replacement of resources, the system will first create the new resource, move that new resource into the stack and remove the old resource (s). In case of failures, the system ensures that the stack rolls back to the initial state.

15 Claims, 6 Drawing Sheets

USING A TEMPLATE TO UPDATE A STACK OF RESOURCES

BACKGROUND

In the context of computer networking, web services and other computing services provide a way to access software functionality that can be reused for a variety of purposes by different clients. In recent years, numerous service providers have emerged which provide technologies that deliver computation, software, data access, and storage services that do not require end-user knowledge of the physical location and configuration of the system that delivers those services. Ordinarily, such network-accessible service providers deliver applications via the internet as a metered service on behalf of an owner of the application. These applications are typically accessed from web browsers, desktop and mobile apps by various end users, while the business software and data are stored on servers at a remote location that is managed by the service provider. In this manner, the owner of the application is relieved of the burden of having to build and maintain the various hardware and software infrastructure needed to run their application(s). In turn, this can cut down on costs and maintenance, improve reliability and scalability, and provide enhanced agility (time-to-market) for deploying new applications.

In this network-accessible service environment, the issues of upgrading or downgrading applications and performing other service modifications have become topics of some attention. For example, some owners of network-accessible services frequently desire to change the functionality in their application, which often physically resides on a remote network of the service provider. Because these owners usually do not have direct access to the actual physical resources, such modifications may need to be performed remotely, which can present a number of difficulties and concerns.

BRIEF DESCRIPTION OF THE DRAWINGS

Various embodiments in accordance with the present disclosure will be described with reference to the drawings, in which.

DETAILED DESCRIPTION

Figure 1:
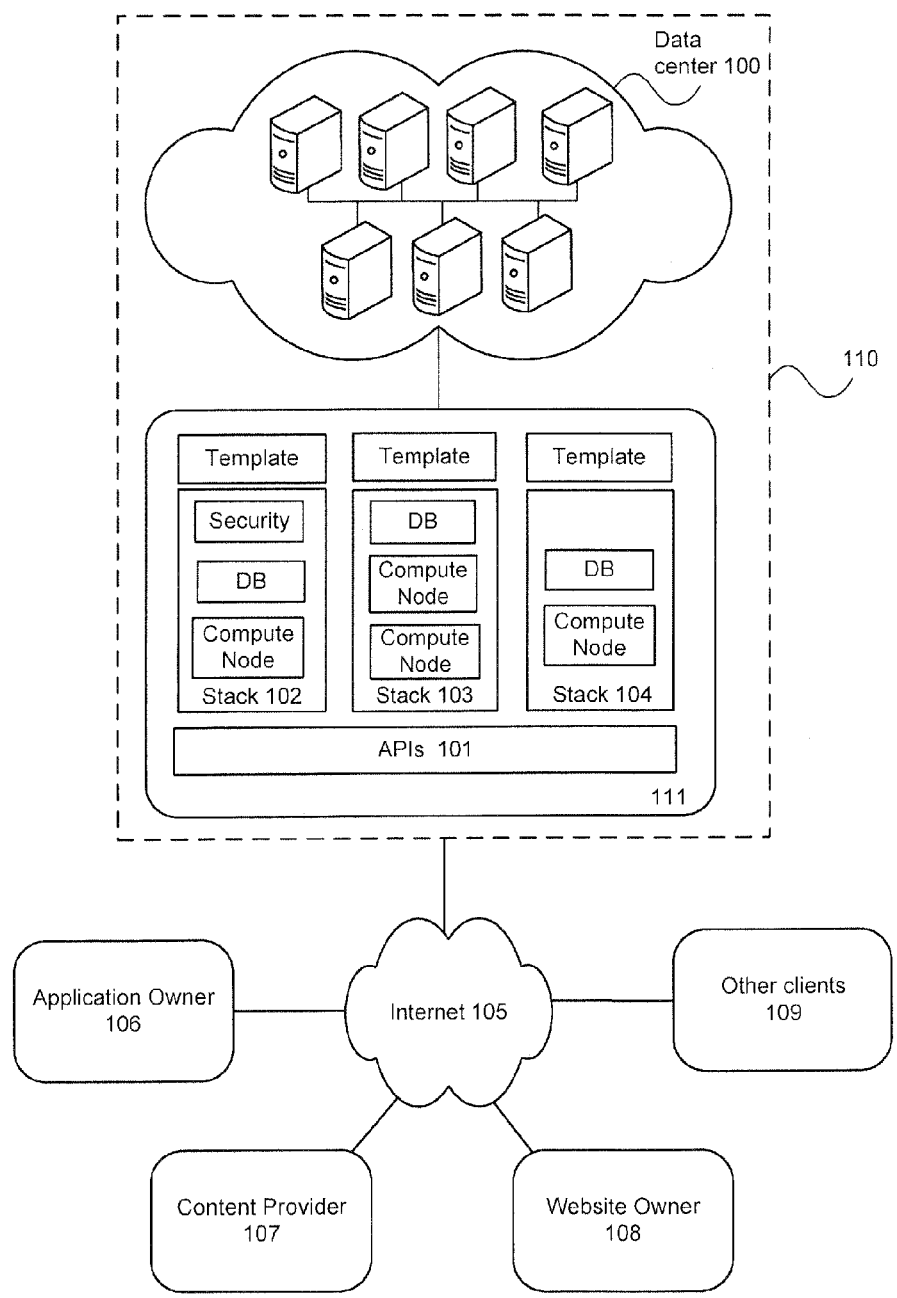
FIG. 1 is an illustration of a system environment that utilizes stacks of resources to provide a network-accessible service, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for updating and modifying software and/or hardware. In particular, the various embodiments provide approaches for using a template to update a stack of resources located on a remote system that provides network accessible services.

In accordance with various embodiments, systems and methods are described for updating a stack of resources in a network-accessible service environment. The systems and methods enable a user to upgrade or downgrade an existing stack of resources by providing a template to the system of a network-accessible service provider, where the template reflects the desired end state of the stack.

In accordance with an embodiment, a stack is a set of resources on a network-accessible services provider, running together as a single unit. The stack can provide at least one network-accessible service (e.g. an application) to various clients and can include such resources as compute nodes (e.g. virtual machines, virtual server instances), databases, front-end machines, middleware (e.g. application servers, web servers, etc.), security modules, load balancers, queues, topics, subscriptions and others. In accordance with an embodiment, the resources of the stack are bundled together in a single definition and operate as a single unit to enable the network-accessible service. For example, a user that wishes to deploy a web application may create a stack that is comprised of a database, several compute node instances and a front end interface. The stack can be created and managed for the user on a network-accessible service provider that provides access to the stack for end users over a network such as the Internet. As used throughout this disclosure, the terms "network accessible service provider," or "service provider" are used interchangeably and are intended to mean any operator, system or other entity that provides and/or manages a set of services (e.g. applications, web sites, databases, etc.) on behalf of the clients or users of the provider.

In accordance with an embodiment, in order to update the stack, a user invokes an application programming interface (API) of the system, passing in the current stack identifier and the desired end state template as parameters to the method call. The system then automatically detects changes (if any) and determines the order in which the update is to be performed. In accordance with an embodiment, the system also detects (1) if the desired changes to the stack are a result of direct modifications to the resource; or (2) a change will be needed because parameters to the resources have changed; or (3) if there will be changes to a resource as an indirect result of any other dependency/attribute of the resource changing.

In accordance with an embodiment, the system decides which resources of the stack can be updated "in-place" and which resources need to be replaced (alter vs. update decision). In case of replacement of resources, the system will first create the new resource, move that new resource into the stack representation of the user's resource and then remove the old resource(s). In case of failures, the system can also ensure that the stack rolls back to the initial state when the request was made, ensuring a running stack entity.

The changes that can be made to the stack can include but are not limited to such changes as adding resources to the stack, removing resources from the stack, modifying the size or other attribute of a resource in the stack, the metadata of a particular resource in the stack, and the like. The system also allows for metadata changes only (i.e. changes made purely to the metadata no changes to the resources) as well as a full audit trail of steps taken during in the transition. It also provides for successive updates to a stack. For example, it may be desirable for a client to carry out a large upgrade of their service in a sequence of incremental steps, so that various integrity checks can be implemented upon completion of each step.

FIG. 1 is an illustration of a system environment that utilizes stacks of resources to provide a network-accessible service, in accordance with various embodiments. As illustrated, a network-accessible service provider 110 can maintain a physical data center 100 that includes the various computer servers, data storage machines, network devices and other hardware resources necessary to provide the various applications and services on behalf of the clients (106, 107, 108, 109) of the provider. In accordance with an embodiment, the service provider can expose its application programming interfaces (APIs) 101 to those clients in order to enable the clients to create, maintain and manage the resource stacks that can be used to run the services and applications over the Internet 105.

In accordance with an embodiment, each stack (102, 103, 104) represents a collection of resources needed to run the particular application or service. The resources can include server instances or compute nodes, databases, load balancers, notification service topics and subscriptions, security users, groups and policies, domain name system (DNS) records, elastic internet protocol (IP) addresses and various others. For example, a compute node can be a virtual machine that is created and managed by a service provider on behalf of its customer in order to meter the customer's application and its usage of the service provider's resources. In accordance with an embodiment, the compute node can be implemented as hardware, software or combination thereof, and can be associated with a particular computing capacity, storage capacity, cost per usage and the like. A database instance can be a resource for storing data that can be accessed by the compute node (i.e. server instance). An elastic IP address resource can be implemented as a reference that represents an IP address that can be moved from being assigned to one resource to being assigned to another resource.

In accordance with an embodiment, a resource (e.g. compute node, database, etc.) can be a virtual resource (e.g. a virtual compute node instance, a virtual database instance, etc.) created and managed by the service provider in order to meter the usage and charges for running the application on behalf of the client. Alternatively, the resource can be mapped to actual physical components (e.g. actual computer server, etc.).

In accordance with an embodiment, each stack is associated with a template. A template can be implemented as a Javascript Object Notation (JSON) formatted text file that describes the resources needed to execute an application or service along with any inter-connection between them. Templates concisely capture resource relationships, such as the server instances that must be associated with a load balancer. The template can be parameterized to enable a single template to be used for many infrastructure deployments that have different configuration values, such as how many instances to spin up for the application. Templates can also provide output properties that can be used to easily communicate configuration or the results of deploying the template back to the user. For example, when instantiated, a template may provide the uniform resource locator (URL) of the load balancer endpoint that the client should use to connect to the newly instantiated application. In accordance with one embodiment, all resources in a template are identified using logical names, allowing multiple stacks to be created from a template without fear of naming collisions between resources.

In accordance with an embodiment, the template can be provided by the client using a console, a command line tool, an application programming interface (API), or any other means known in the art. Templates can be used to both create a resource stack, as well as update the resource stack when changes are needed.

In accordance with an embodiment, a stack (102, 103, 104) is the collection of resources that result from instantiating a template. A stack is created by supplying a template and any required parameters to the service formation system. Based on the template, the system determines what resources need to be created and in what order. The order can be determined by the dependencies specified between the resources declared in the template. Some of these dependencies are implicit, where a relationship between the resources implies a dependency. In other cases, the dependency is explicit, where the template author can define a dependency between the resources, ensuring one is created before the other.

In accordance with an embodiment, stacks can be created, updated and deleted using the service formation system 111. During stack creation, the system 111 records the mapping from the logical name given in the template (e.g. 'myServer') to the actual name of the resource that is instantiated (e.g. instance name 'i-19d3ac161'). The stack creation status and resource name mappings can be made available via the API 101.

Figure 2:
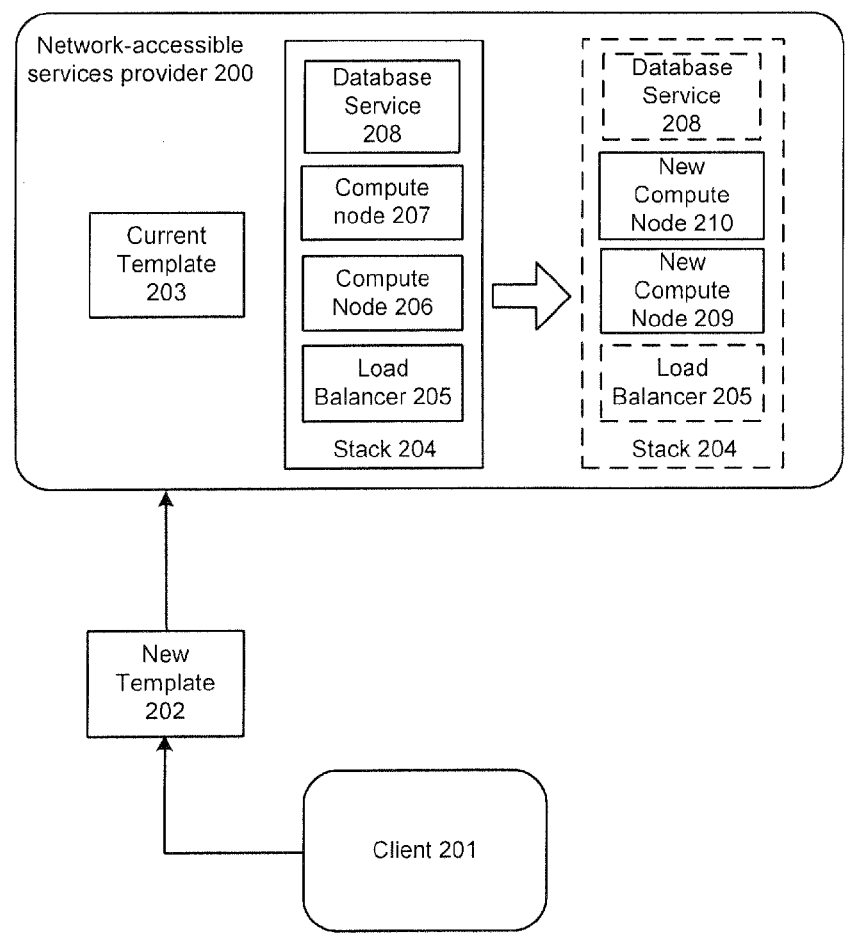
FIG. 2 is an illustration of updating a stack of resources by using a template, in accordance with various embodiments.

FIG. 2 is an illustration of updating a stack of resources by using a template, in accordance with various embodiments. In accordance with an embodiment, a stack 204 is updated by supplying a new template 202 that contains the desired configuration of all of the resources in the stack. The properties of the existing resources in a stack can be modified to react to changes in the environment or new application requirements. For example, the alarm thresholds can be modified or the machine image (operating system) running on a server instance can be changed. In accordance with an embodiment, the system takes care of rolling the changes through the different resources in the stack. In accordance with an embodiment, the changes can be made without impacting a running application. In alternative embodiments, if a change cannot be made dynamically (e.g. updating the operating system on a compute node), the system will create a new resource and move it into the stack, deleting the old resource once the system can ascertain that the full update will be successful.

Continuing with the illustration in FIG. 2, a client owner 201 of the application or service can initiate a request to update stack 204 by supplying a new template 202 that specifies the end state of the resources of the stack 204. In accordance with an embodiment, this request can be provided by invoking an API call to start the update process for an existing stack. The input parameters to the call can include the stack name (e.g. unique stack identifier) and a filename (e.g. URL) for the updated template. Once the system receives the template, it can retrieve the previous template for the designated stack and compare them to compute a difference that is introduced to at least one resource in the stack by the new template. For example, as illustrated in the figure, the resources of stack 204 include a load balancer 205, two compute nodes (206, 207) and a database service instance 208. The new template specifies that changes will need to be made to the two compute nodes (206, 207). By way of illustration, the template may specify that the two compute nodes (206, 207) should be upgraded from medium to large compute node instances (209, 210) in order to accommodate more traffic by the application.

In accordance with an embodiment, once the system computes the differences, it can determine what changes will need to be performed and the order in which to perform them in order to bring the stack up to the desired end state specified in the new template. It can then carry out those changes in the appropriate order. In accordance with an embodiment, the system can determine whether the changes can be implemented as a running update or require a destructive update. If the update is a running update, then the system can modify the resources while those resources are running, without the need to stop and restart each resource. Otherwise, if update is a destructive update, then the system will create the new resource, add the new resource into the stack and remove a previous version of said resource from the stack. When making the modifications to the resources, the system can also determine whether the changes will invoke any dependencies that would cause changes to other resources (other than the resources which are being modified). If the dependencies would cause such cascading changes, the system can perform the appropriate modifications to resolve the dependencies on the other resources.

Once all of the changes have been attempted, the system can determine whether the update to the stack was successful. In accordance with an embodiment, a stack will either be created or updated in its entirety or rolled back if it cannot be fully instantiated or modified. If the process of updating the stack completes successfully, the stack will be in the "update complete" state. If the stack update fails, the system will rollback any resource changes that have been made so that the stack is returned to state described in the original template.

Figure 3:
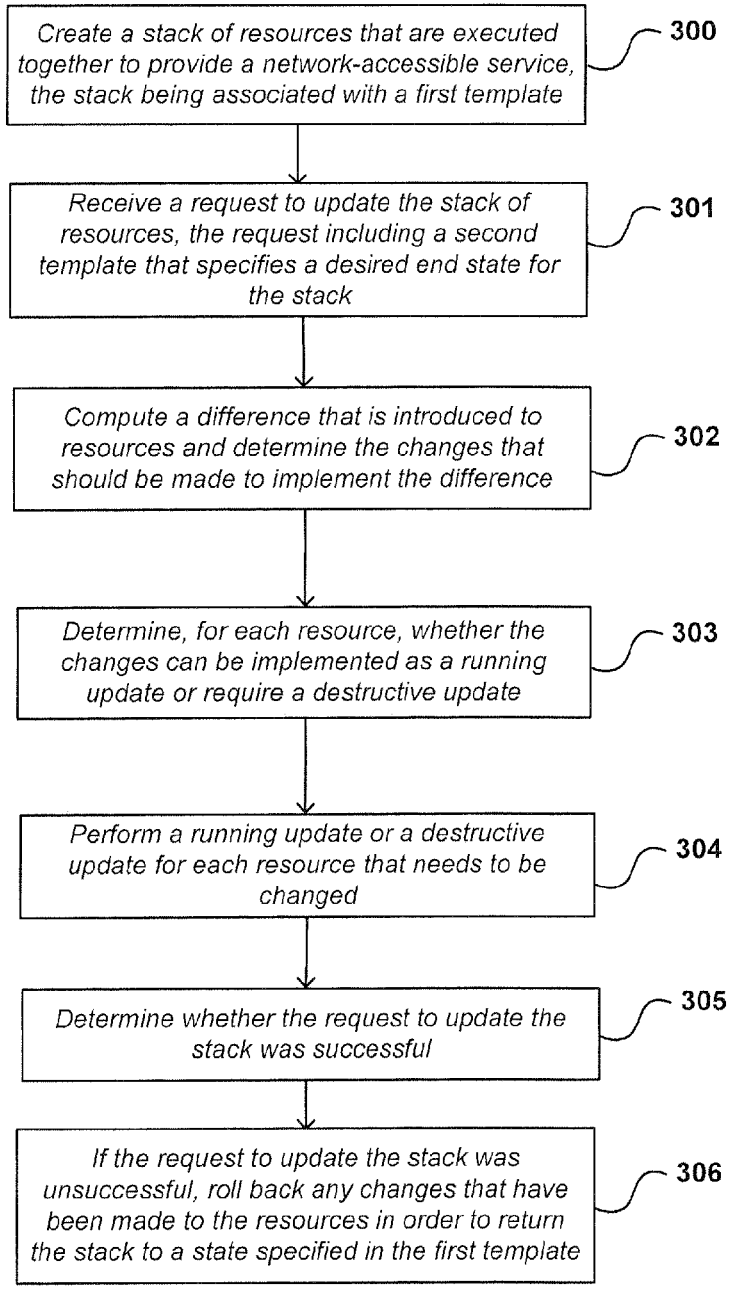
FIG. 3 illustrates an example process for updating a stack of resources using a template, in accordance with various embodiments.

FIG. 3 illustrates an example process for updating a stack of resources using a template, in accordance with various embodiments. Although this figure, as well as any other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

As illustrated in step 300, the system can be used to create a stack of resources that are executed together to provide a network-accessible service. In accordance with an embodiment, this can be done by a client providing a template that describes the resources which will be used to enable the service and the relationships among those resources.

In step 301, a request to update the stack of resources is received from the client of the service provider. In accordance with an embodiment, the request includes a new template (e.g. second template) that specifies a desired end state for the stack. This desired end state can include a number of changes to the stack, including but not limited to adding a resource to the stack, removing a resource from the stack, modifying the size or other attribute of a resource in the stack, modifying the metadata of the stack or a particular resource in the stack, and the like.

In step 302, the system can compute the differences that are introduced to the resources in the stack between the first template and the second template. In addition, the system can determine which changes should be made in order to implement the computed differences and the order in which those changes should be performed across the resources.

In step 303, the system can determine whether the changes can be implemented as a running update or require a destructive update. This can be performed for each resource and the decision can be based on whether the changes determined in step 302 are treated as mutable changes or immutable changes. For example, a modification to the machine image (e.g. operating system) of a compute node may be considered an immutable change that will need to create a new resource in order to take effect. On the other hand, modifying metadata of a particular resource may be considered a mutable change that can be performed while the resource is running. In accordance with an embodiment, some of the resources may be able to updated with a running update, while other resources may require a destructive update.

As shown in step 304, the update is performed on each required resource as either a running update or a destructive update. In the case of mutable changes, the system can simply use an "update" or "modify" type of API calls to update the underlying resource while the resource is running. For immutable changes, however, the system will create a new replacement resource with the updated properties and then link the replacement resource into the stack before deleting the old resource. Once the resource is running, the system can update other resources in the stack (e.g. modify IP addresses) to point to the new resource.

In step 305, the system can determine whether the update to the stack was successful. If at least some of the changes were unsuccessful, the system can roll back all of the changes that were made to the resources to bring the stack back to the state specified in the previous template (i.e. first template), as shown in step 306. In this manner, the client is guaranteed that either the entire update to the stack was successful and the stack is in the desired end state, or that none of the changes were implemented and the stack remains in the running state specified in the old template.

Figure 4:
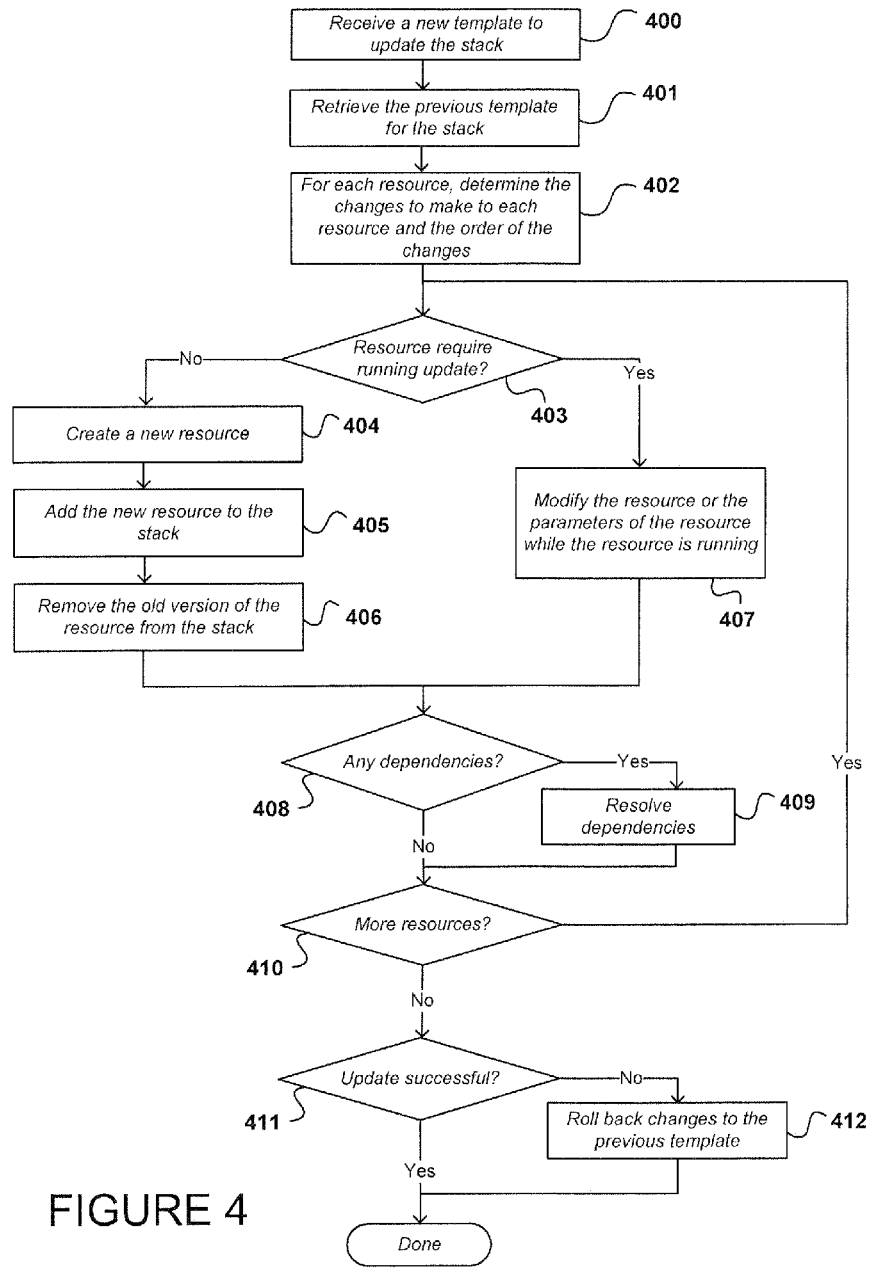
FIG. 4 is an example of a flow chart illustration that can be used to update a stack of resources with a template, in accordance with various embodiments.

FIG. 4 is an example of a flow chart illustration that can be used to update a stack of resources with a template, in accordance with various embodiments. As illustrated, the process can begin in step 400, when the system receives a new template which will be used to update a particular stack of resource. The template and the stack can be identified in a parameter to an API call. Once the system receives the template, it can find and retrieve the previous template associated with the stack (step 401). The new template can then be compared to the previous template in order to ascertain the differences that are desired. Based on the comparison of the templates, the system can determine the changes that will need to be made to the resources of the stack and also determine the order that those changes will need to be performed in (step 402). Based on this information, the system can determine which changes will need to be made to each specific resource.

In step 403, the system can determine for each resource whether the update is a running update or a destructive update, as previously described. If the update is a running update, then the system can modify the resources while those resources are running, without the need to stop and restart each resource (step 407). Otherwise, if update is a destructive update, then the system will create the new resource (step 404), add the new resource into the stack (step 405) and remove a previous version of said resource from the stack (step 406).

In step 408, the system further determines whether there are any dependencies that would cause cascading changes to be performed to other resources. For example, if the changes to the particular resource caused some cascading changes to other resources, then as part of updating the current resource, the other resources would need to be modified as well. The other resources may be part of the same stack or may be located outside of the stack. In accordance with an embodiment, the system can evaluate the dependencies by building an internal dependency tree based on the contents of the new template when compared with the old template. If such dependencies exist, the system can resolve them by performing the appropriate changes in the appropriate resources (step 409).

In step 410, the system determines whether there are any more resources that need to be changed based on comparing the new template to the existing template of the stack. If additional resources need to be modified, the process can loop back to step 403, to implement those changes for the next resource. If no more resources need to be modified, the process can continue to step 411.

In step 411, the system determines whether the update was successful. If at least some of the changes were not successful, the system can roll back all of the changes that were made, to bring the stack back to the state indicated in the previous template (step 412). If all of the changes were successful, the process ends.

Figure 5:
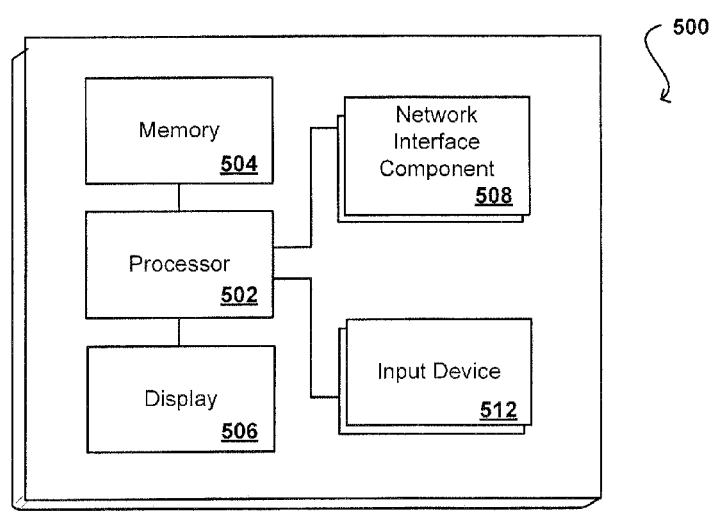
FIG. 5 illustrates a logical arrangement of a set of general components of an example computing device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
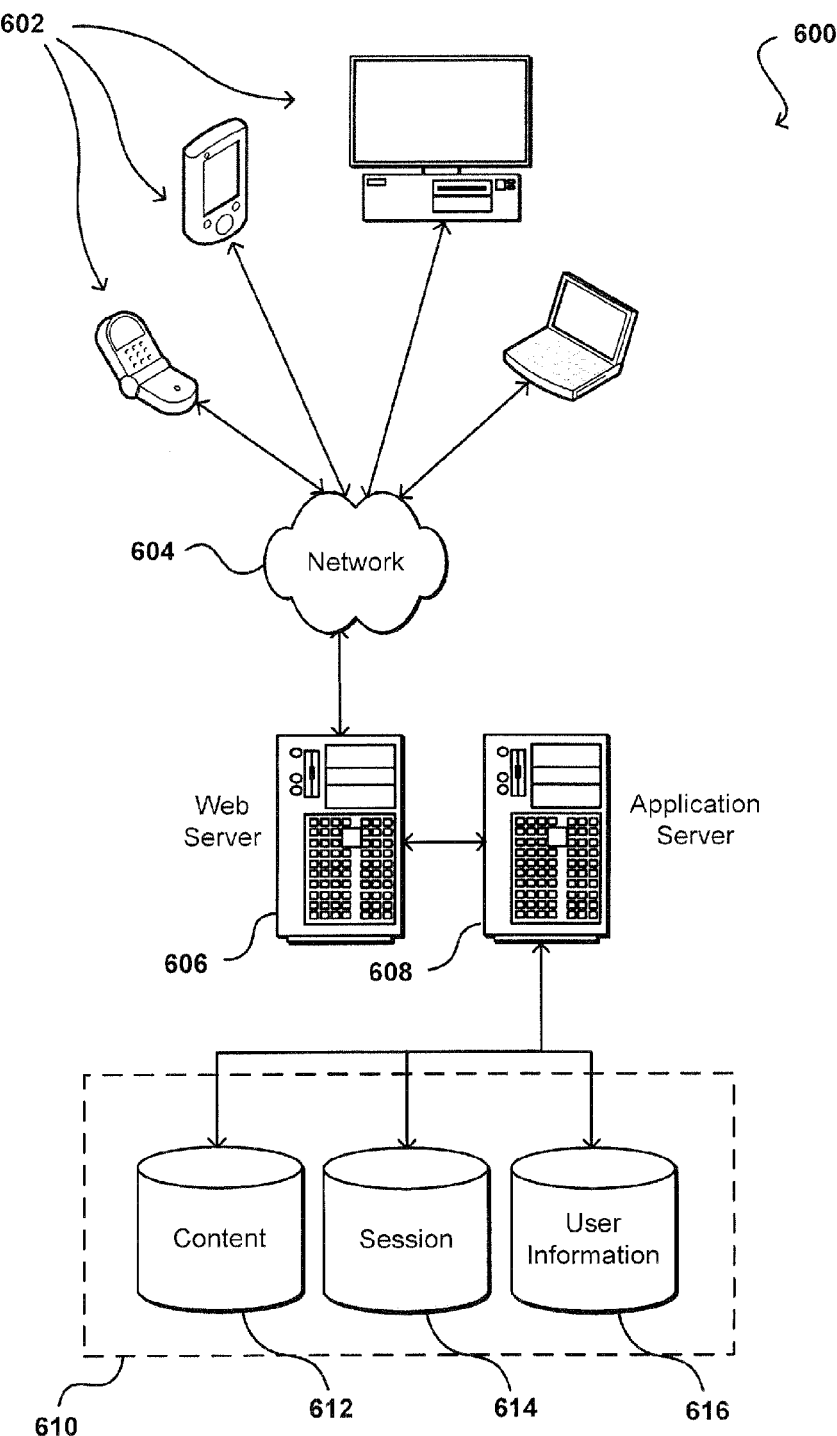
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602.

Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for updating resources in a network-accessible service environment, said method comprising:

receiving a request to update a stack of resources as specified in a template that indicates a desired end state for the stack of resources;

determining one or more modifications that should be made to at least one resource in the stack and an order in which said one or more modifications should be performed in order to bring the stack to the end state indicated in the template;

performing the one or more modifications to the at least one resource in the stack;

determining whether the one or more modifications were successful such that the stack reached the end state indicated in the template;

if the one or more modifications were unsuccessful, rolling back the one or more modifications that have been made to the at least one resource in the stack;

determining a set of dependencies associated with the resource;

determining whether the set of dependencies require any cascading changes to one or more other resources in order to update the resource; and if any cascading changes are required, resolving the set of dependencies by performing the cascading changes to the one or more other resources.

2. The computer implemented method of claim 1, wherein performing the one or more modifications further includes:

determining whether the one or more modifications can be made to the resource while the resource is running or whether a new resource is required to implement the one or more modifications; and if the new resource is required, then creating the new resource, adding the new resource into the stack and removing a previous version of the resource from the stack.

3. The computer implemented method of claim 1, wherein receiving the request to update the stack further includes:

receiving a method call of an application programming interface (API) to update the stack, wherein a stack identifier and the template are provided as parameters to the method call of the API.

4. The computer implemented method of claim 1, wherein the update modifies a set of metadata associated with the stack, wherein the metadata is provided to the resources in the stack.

5. The computer implemented method of claim 1, further comprising:

performing a set of successive updates incrementally to implement an upgrade that includes a plurality of changes to the resources in the stack.

6. A computing device including a storage memory storing a set of instructions and one or more hardware processors that execute the set of instructions to perform a set of steps comprising:

determining one or more modifications that should be made to at least one resource in a stack of resources in order to bring the stack to an end state specified in a template received from a client, the stack of resources operating together to provide at least one network-accessible service, wherein the template is received from the client by a service provider receiving a method call of an application programming interface (API) to update the stack, wherein a stack identifier and the template are provided as parameters to the method call of the API; and determining an order in which said one or more modifications should be performed to the at least one resource in order to bring the stack to the end state indicated in the template received from the client;

performing the one or more modifications to the at least one resource in the stack;

determining whether the one or more modifications were successful such that the stack reached the end state indicated in the template; and if the one or more modifications were unsuccessful, rolling back the one or more modifications that have been made to the at least one resource in the stack.

7. The computing device of claim 6, wherein instructions for performing the one or more modifications further include instructions for performing the steps of:

determining whether the one or more modifications can be made to the resource while the resource is running or whether a new resource is required to implement the one or more modifications; and if the new resource is required, then creating the new resource, adding the new resource into the stack and removing a previous version of the resource from the stack.

8. The computing device of claim 6, further comprising instructions for performing the steps of:

determining a set of dependencies associated with the resource, and determining whether the set of dependencies require any cascading changes to one or more other resources in order to update the resource; and if any cascading changes are required, resolving the set of dependencies by performing the cascading changes to the one or more other resources.

9. The computing device of claim 6, wherein the update modifies a set of metadata associated with the stack, wherein the metadata is provided to the resources in the stack.

10. The computing device of claim 6, further comprising instructions for performing the step of:

performing a set of successive updates incrementally to implement an upgrade that includes a plurality of changes to the resources in the stack.

11. A non-transitory computer readable storage medium storing one or more sequences of instructions executable by one or more processors to perform a set of steps comprising:

receiving, by a service provider, a request to update a stack of resources from a client, the template indicating a desired end state for the stack of resources, the service provider allocating the resources to the client to provide at least one network-accessible service;

determining one or more modifications that should be made to at least one resource in the stack and an order in which said one or more modifications should be performed in order to bring the stack to the end state indicated in the template;

performing the one or more modifications to the at least one resource in the stack;

if the one or more modifications were determined to be unsuccessful, rolling back the one or more modifications that have been made to the at least one resource in the stack;

determining a set of dependencies associated with the resource;

determining whether the set of dependencies require any cascading changes to one or more other resources in order to update the resource; and if any cascading changes are required, resolving the set of dependencies by performing the cascading changes to the one or more other resources.

12. The non-transitory computer readable storage medium of claim 11, wherein instructions for performing the one or more modifications further include instructions for performing the steps of:
- determining whether the one or more modifications can be made to the resource while the resource is running or whether a new resource is required to implement the one or more modifications; and
- if the new resource is required, then creating the new resource, adding the new resource into the stack and removing a previous version of the resource from the stack.

13. The non-transitory computer readable storage medium of claim 11, wherein instructions for receiving the request to update the stack further include instructions for performing the step of:
- receiving, by the service provider, a method call of an application programming interface (API) to update the stack, wherein a stack identifier and the template are provided as parameters to the method call of the API.

14. The non-transitory computer readable storage medium of claim 11, wherein the update modifies a set of metadata associated with the stack, wherein the metadata is provided to the resources in the stack.

15. The non-transitory computer readable storage medium of claim 11, further comprising instructions for performing the step of:
- performing a set of successive updates incrementally to implement an upgrade that includes a plurality of changes to the resources in the stack.

* * * * *